Sept. 18, 1945.   A. F. WILLIAMS   2,384,867
SPECTACLES
Filed May 30, 1942   2 Sheets-Sheet 1

Inventor
ARTHUR F. WILLIAMS
Attorney

Sept. 18, 1945. A. F. WILLIAMS 2,384,867
SPECTACLES
Filed May 30, 1942 2 Sheets-Sheet 2
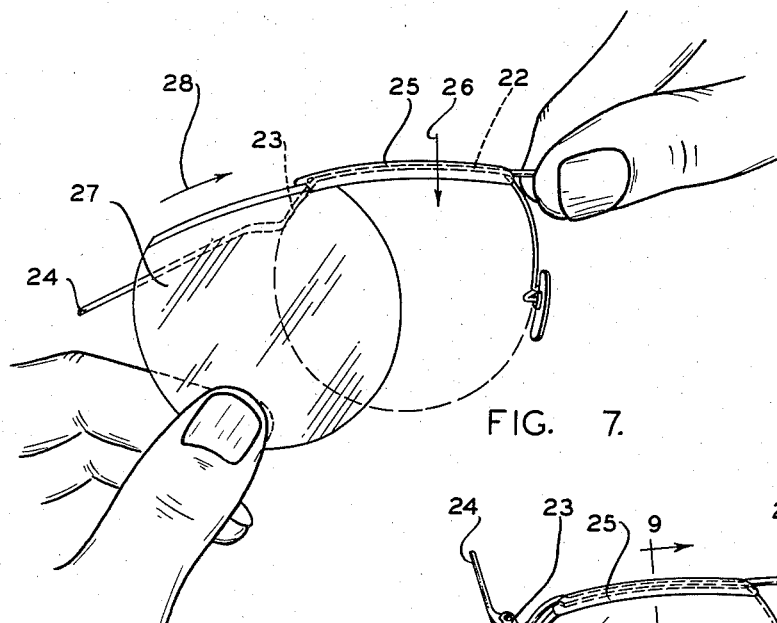
FIG. 7.
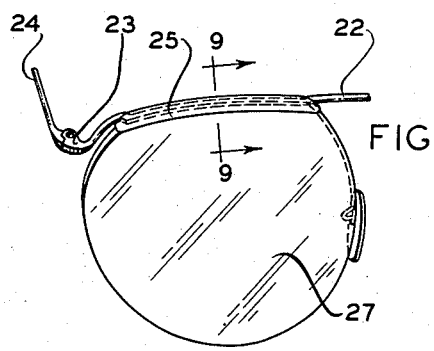
FIG. 8.
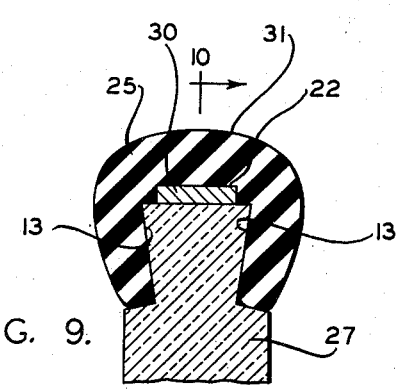
FIG. 9.
FIG. 11.
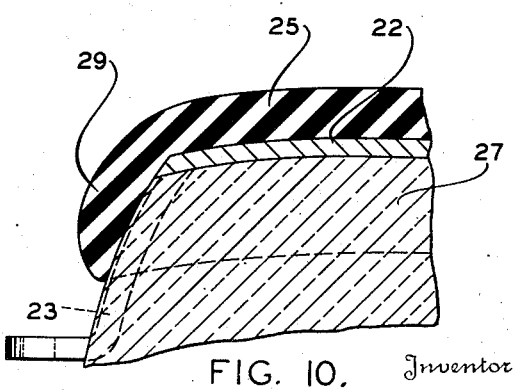
FIG. 10.
Inventor
ARTHUR F. WILLIAMS
Attorney Patented Sept. 18, 1945

2,384,867

UNITED STATES PATENT OFFICE 2,384,867

SPECTACLES

Arthur F. Williams, St. Paul, Minn., assignor to Wils-Edge Corporation, St. Paul, Minn., a corporation of Minnesota Application May 30, 1942, Serial No. 445,404

2 Claims. (Cl. 88—47)

This invention relates to improvement in spectacles and is designed to support the lenses of the spectacles by a sectional plastic frame portion. This sectional frame portion is adapted to extend along the top edge of the lens and is designed to secure the lens rigidly in place, held by the spectacle frame with the major peripheral edge of the lens unbounded by any frame portion.

The primary feature of the invention resides in securing the eyeglass lens to the spectacle frame by a plastic channel. The lens is adapted to be grooved in the manner defined in my Patents Nos. 2,229,994, 2,069,347, 2,198,852, 2,091,296, 2,188,585, D121,151 and D118,298. These patents include a grooving machine which is designed to marginally groove a portion of the edge of the lens so that the lens may be attached without boring holes through the body of the lens, but rather by forming a small groove marginally along the edge of the lens so that the channel can support the same to the frame.

Heretofore my frames were made entirely of metal so that the portion of the frame which supported the grooved edge of the lens was formed more or less with a dovetailed channel groove so that the grooved portion of the lens would slip into the channel and be cemented in place.

This invention provides a new means of supporting the lens by a plastic preformed channel which is adapted to slip over the wire metal frame of the spectacles and then the grooved edge of the lens is slid into the plastic channel while the open end of the channel may be bent or closed down on the edge of the lens, locking the same in place.

It is also a feature to provide a spectacle frame wherein the wire which forms the frame may be formed in a single piece from temple to temple, including the nose bridge portion and providing slip-over plastic channels which act as the lens supporting means. Thus a primary feature resides in providing a non-metallic plastic channel means for gripping and supporting the eyeglass lenses to hold the same firmly in place supported by the wire frame of the spectacles. The plastic channels may be of various colors and these portions are adapted to extend along virtually in line with the eyebrow of the wearer, and thus the wearer may select the color desired as well as providing a convenient means of replacing a lens when it becomes necessary by simply removing the old plastic channel means and slipping a new channel over the wire frame of the spectacle, and then sliding the lens into the plastic channel which firmly and rigidly holds the eyeglass lens in place.

A feature of this frame construction resides in providing a lens supporting means made of plastic which extends along the top edge of the lenses of the spectacles virtually in line with the eyebrow of the wearer.

A further object resides in providing a plastic lens gripping and supporting frame which is reinforced by a suitable metal angular member embedded within the plastic frame and adapted to engage at least one side of the lens. The metal reinforcing is anchored within the plastic frame portion and may extend in a channel form so as to engage on both sides of the lens if it is desired.

A further feature of my frame construction resides in providing a nonmetallic frame portion which can be made of plastic material so that various colored frames can be provided for supporting the lenses and it is of primary importance that the plastic frame firmly grip the grooved sides of the lens to fix or cement the lens in the plastic frame. Thus the plastic frame forms a nonmetallic gripping means which may be cemented in any suitable manner, either by heating or softening the plastic frame section and molding it to the lens, or by a cement which will temporarily soften the inner groove in which the grooved portion of the lens fits, so that when the plastic frame section again hardens it will grip the grooved portions of the lens in a manner to cement the lens in the plastic frame section, or by means of the friction tension of the plastic material on the glass edges with which it comes in contact.

These features together with other details and objects will be more fully hereinafter pointed out.

In the drawings forming a part of this specification:

Fig. 7 is a perspective view, showing the manner in which the lens is slipped into the plastic channel.

Fig. 8 is a front view, showing the spectacle lens slipped in place after the operation of Fig. 7 is complete.

Fig. 9 is an enlarged section on the line 9—9 of Fig. 8.

Fig. 10 is a section on the line 10—10 of Fig. 9.

Fig. 11 is a similar section to Fig. 9, showing the nonmetallic or plastic channel in a slightly different form.

The drawings illustrate the spectacles A which may be of any suitable design or style and I have illustrated a bridge portion 10 which connects a pair of plastic frame sections 11 in a manner to support the lenses 12 along the top edge of the lenses.

The lenses 12 are adapted to be formed with grooves 13 on either side of the upper peripheral edge of the lens which is accomplished in the manner described in my patents above set forth.

It is apparent that the lenses 12 may be grooved on both sides or on one side so as to form a dovetailed edge along the upper portion of the lenses 12.

Figures 2, 3:
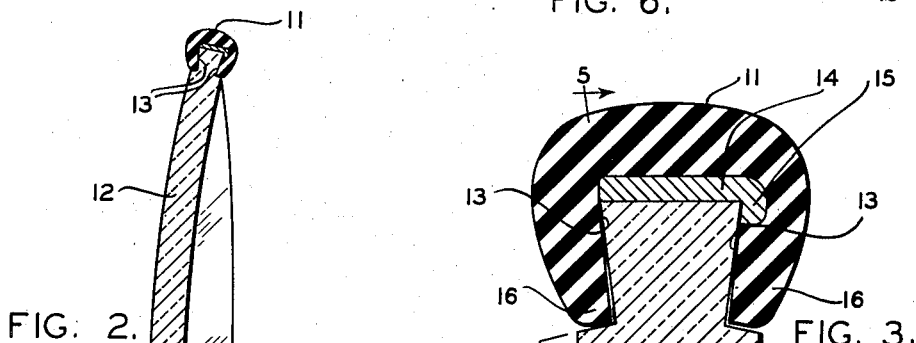
Fig. 2 is an enlarged section on the line 2—2 of Fig. 1.
Fig. 3 is a similar section to Fig. 2, showing only a detail portion of the lens with the reinforcing member anchored in the plastic frame.

The plastic frame sections 11 are formed of any suitable material and of any desired color of material which may be molded with a reinforcing metal angle member 14 embedded within the base of the groove of the plastic channel section 11. In the angle reinforcing metal member 14 shown in Fig. 3, a longitudinal flange 15 projects downward along one edge and is adapted to form a means of engaging the side of the dove-tailed groove 13 of the lens 12.

The plastic frame section 11 is formed with depending sides 16 which project below the reinforcing angle 14 and are adapted to engage firmly against the dove-tailed sides 13 of the lens 12. These sides 16 provide a nonmetallic means of engaging the groove portions of the lens 12. In securing the lens 12 in the plastic frame sections 11, the sides 16 may be formed in a manner to grip the dove-tailed portions 13 by friction and by reason of the sides 16 being spaced slightly closer together than the width of the dove-tailed groove formed in the top edge of the lens. However, the sides 16 of the plastic frame portions 11 may be softened by heat and pressed firmly together against the grooved edge of the lens 12 while soft and thus be caused to firmly grip the grooved edge of the lens when the sides 16 cool and become set.

Figure 1:
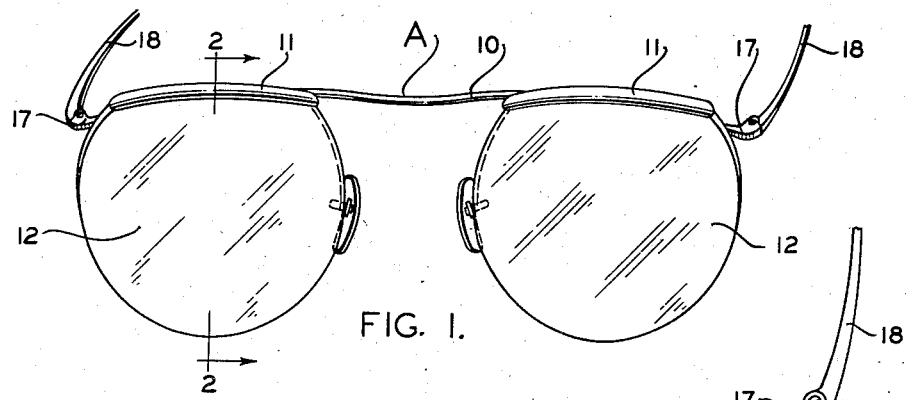
Fig. 1 is a front perspective view of my spectacles, showing the nonmetallic plastic frame sections gripping the upper edges of the lenses.

I have also found that the plastic frame portions 11 of my spectacles A may be softened within the channel portion of the frame by a suitable cement which temporarily softens the inner surfaces of the groove in the channel 11 so that the grooved portion of the lens may be slid into the channel of the plastic section 11 while the inner surface of the same is softened by the cement. Then when the inner surface of the channel 11 hardens, it is adapted to cement or seal the lens 12 rigidly in the plastic frame sections 11. Thus the lenses 12 may be held by nonmetallic gripping plastic frame sections as illustrated in Fig. 1. It is desirable that the lenses 12 of the spectacles A be held by nonmetallic or plastic gripping frame sections 11 because a plastic frame of this character cushionally supports the lens in the frame.

A feature of my frame resides in providing a simple inexpensive means of supporting spectacle lenses by nonmetallic or cushioning frame sections which may be molded to the grooved edge or form of the lens and at the same time hold the lens by a nonmetallic frame which has a softer and more desirable gripping means on the edge of the lens than metal frames. Thus the lenses are protected against jarring and breaking.

A further feature resides in a plastic frame section which permits the plastic portion of the section of the frame to be made small and streamlined, yet being strong by the reinforcing means within the same.

The angular metal reinforcing members 14 are connected to the metal bridge portion 10 on the inner ends and to the metal arms 17 which support the bows 18 of the spectacle frames.

Figure 4:
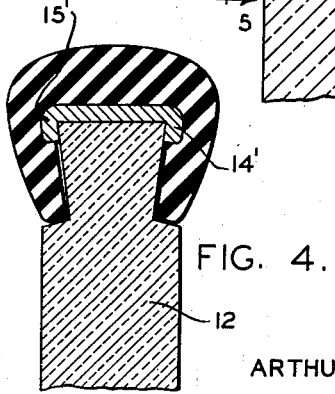
Fig. 4 is a similar sectional detail to Fig. 3, showing another form of reinforcing means within the plastic frame section.

In Fig. 4 the channel member portion 14' is provided with a pair of depending side flanges 15' so as to provide a metal supporting base member in the channel of the plastic frame portion 11.

Figure 5:
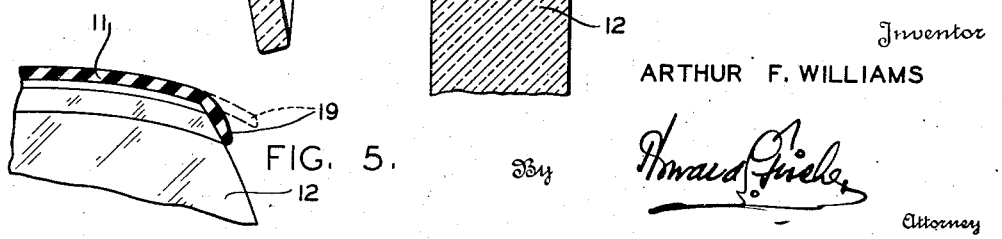
Fig. 5 is a section on the line 5—5 of Fig. 3.

In Fig. 5 I have illustrated an alternative form of the frame 11 in which an end portion 19 may be provided which can be bent down against the edge of the lens 12 after the lens has been slid into the channel of the plastic frame 11 to hold the lens locked firmly in place. The end portion 19 may be formed integral and bent down as illustrated by the full and dotted lines in Fig. 5.

Figure 6:
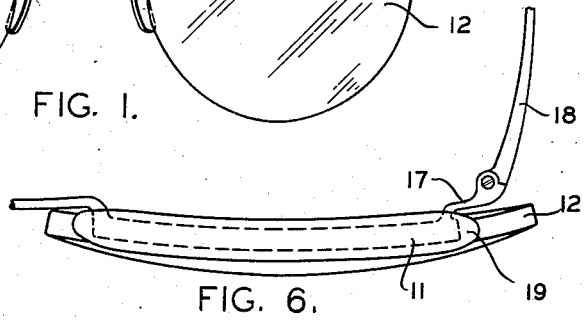
Fig. 6 is a detail plan view showing the manner in which the arms project from the plastic frame sections.

In Fig. 6 I have illustrated a detail plan of a portion of the end of the frame 11 showing the arm 17 projecting out of the plastic frame section 11 and depending therefrom in a manner to support the temple member 18.

The preferred form of my spectacle frame is illustrated in Figs. 7 to 11, inclusive, wherein the wire frame portion 22 is formed of a single piece and extends from temple to temple. The wire frame portion 22 may be made of any suitable material such as rolled gold or other similar material and is preferably of a small cross-sectional dimension and shaped to provide a neat and attractive design in that portion extending across the bridge of the nose. When the frame is formed in this manner by a single wire it may be provided with the integral depending arms 23 at the temple sides for the temple bows 24.

In the construction illustrated in this preferred form as shown in Figs. 7 to 11, inclusive, the wire frame 22 is comparatively small and the plastic channel frame portions 25 slip down over the wire frame portion 22 as illustrated by the arrow 26 in Fig. 7. This constitutes the assembly of the plastic channel portion 25 with the wire frame portion 22. Then after the channel portion 25 is in place on the wire 22 the eyeglass lens 27 is slipped into place by entering it into the open end of the plastic channel and moving it in the direction of the arrow 28, shown in Fig. 7. When the lens 27 is in place the outer end 29 of the channel 25 may be bent down by heating the plastic channel in any suitable manner, thus locking the lens 27 in the plastic channel. The upper edge of the lens 27 operates to force the wire frame 22 within the recess 30 provided for the same extending longitudinally in the base of the channel groove of the plastic member 25. The wire frame portion 22 which extends in the groove 30 may be curved slightly so that when the lens 27 is slipped into the plastic channel 25, a slight spring tension or frictional engagement is set up between the upper edge of the lens and the wire 22, thereby setting the lens 27 firmly in place in the plastic channel 25.

The plastic channel sections 25 may be made is the cross-sectional shape illustrated in Fig. 9, with a high rounded upper edge 31, or the upper edge 32 shown in Fig. 11 may be comparatively flat as illustrated.

It is desirable that the plastic channel sections 25 be made of tough, strong plastic material, either formed with an acetate base or other similar material known in the trade as "Lucite" where various colors may be obtained, as well as transparent material. When transparent plastic channel sections are used the wire frame portion 22 extending through the same will be visible to the eye. It is also apparent that various colors may be desirable in the transparent material, thus making a very attractive spectacle, as well as providing a better cushioning means for supporting the spectacle lenses. It has been very desirable more recently as it is recognized in the trade that if the spectacle lenses can be supported by nonmetallic means that the lenses are cushioned and are not inclined to break as easily as where metal frames or screws are used to support the lenses and come in direct contact therewith. Therefore I have provided a desirable spectacle frame wherein the wire or metal portions thereof may be made in very light weight material and small in cross-sectional dimension and which may be covered by the plastic lens supporting sections to form a more attractive spectacle frame.

My spectacle frame is streamlined and in forming the frame wire 22 in a single piece from temple to temple, a more desirable frame is provided which may be made economically and with a better appearance because it eliminates a number of soldered joints.

In carrying out my invention I provide a spectacle frame with the plastic portions 11 streamlined to fit the upper edge of the lenses 12 and while I have illustrated a particular design it is apparent that any desirable design or form of plastic channel 11 may be provided, nevertheless, the same should be of a small, neat and trim character, streamlined with the lenses, so as not to have a bulky or heavy appearance such as is employed in the commonly known shell frames formed of plastic material where the shell frame extends entirely around the lens. Furthermore, it is of primary importance in my invention to provide a plastic channel portion 11 which grips a lens along a portion (preferably the upper edge of the same) so that the lens is firmly cemented and locked in the plastic frame 11. Thus the lens is cushioned and firmly supported by a plastic frame section in a very desirable manner.

In accordance with the patent statutes I have described the principles of my invention together with a particular design and detail of construction as set forth in the above specification, and I desire to have it understood that the plastic frame may be modified and the design of the metal frame portions may be accordingly modified to different designs without departing from the spirit of the invention and within the scope of the following claims.

I claim:

1. Spectacles comprising lenses and a frame including a bridge and lens-engaging portions formed from a metal strip, said lenses having upper portions recessed across their inner and outer surfaces to form mounting portions extending along upper portions of the lenses and dovetailed in cross section, the lens-engaging portions of said frame having depending side flanges, and plastic frame sections extending the full length of the lens-engaging portions and formed with side walls extending downwardly in converging relation to each other and defining channels open at their ends, the lens-engaging portions of said frame extending through said channels with their side flanges embedded in walls thereof, and said lenses being slid into said channels through open ends thereof with the side walls of the channels fitting into the recesses of the lenses and gripping the dovetailed portions between them and the flanges of the lens-engaging portions engaging side faces of the dovetailed portions, and said plastic frame sections having end portions extending beyond their side walls and bent downwardly to engage edges of the lenses and hold the lenses against longitudinal movement in the channels.

2. Spectacles comprising lenses and a frame including a bridge and lens-engaging portions formed of metal and having flat under surfaces and depending side flanges along front and rear edges, and plastic frame sections having channels in their under faces extending their full length and open at their ends, the lens-engaging portions of said frame extending longitudinally in said channels against upper walls thereof and having their flanges countersunk in upper portions of side walls of the channels, said lenses having ribs along their upper portions slid into said channels through ends thereof and gripped between side walls thereof, and said plastic frame sections having end portions projecting from outer ends of the lens-engaging portions of said frame and bent downwardly into position to engage ends of said ribs and prevent movement of the ribs longitudinally in the channels.

ARTHUR F. WILLIAMS.